US012358458B2

(12) United States Patent
Jadhav et al.

(10) Patent No.: US 12,358,458 B2
(45) Date of Patent: Jul. 15, 2025

(54) AIRBAG WITH ROOF INTERACTION

(71) Applicant: Joyson Safety Systems Acquisition LLC, Auburn Hills, MI (US)

(72) Inventors: Yuvraj Jadhav, Auburn Hills, MI (US); John Bauer, Auburn Hills, MI (US); Satish Siruvole, Auburn Hills, MI (US); Tyler Weaver, Auburn Hills, MI (US); Michel Khouri, Auburn Hills, MI (US); Jesus Oliver, Lake Orion, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 18/394,349

(22) Filed: Dec. 22, 2023

(65) Prior Publication Data

US 2024/0217471 A1    Jul. 4, 2024

Related U.S. Application Data

(60) Provisional application No. 63/435,703, filed on Dec. 28, 2022.

(51) Int. Cl.
*B60R 21/231* (2011.01)
*B60R 21/205* (2011.01)
*B60R 21/215* (2011.01)
*B60R 21/239* (2006.01)
*B60R 21/26* (2011.01)

(52) U.S. Cl.
CPC .......... *B60R 21/231* (2013.01); *B60R 21/215* (2013.01); *B60R 21/239* (2013.01); *B60R 21/26* (2013.01); *B60R 21/205* (2013.01)

(58) Field of Classification Search
CPC ... B60R 21/231; B60R 21/215; B60R 21/239; B60R 21/26; B60R 21/205
See application file for complete search history.

(56) References Cited

U.S. PATENT DOCUMENTS

2012/0193896 A1\* 8/2012 Turnbull ............. B60R 21/2334
280/729
2017/0120859 A1\* 5/2017 Ohno .................... B60R 21/263

FOREIGN PATENT DOCUMENTS

| CN | 107021056 B | \* | 9/2019 | ......... B60R 21/2176 |
| CN | 107848486 B | \* | 1/2021 | .......... B60R 21/231 |
| CN | 115027405 A | \* | 9/2022 | .......... B60R 21/231 |
| DE | 102009031124 A1 | \* | 3/2011 | .......... B60R 21/231 |

(Continued)

*Primary Examiner* — Drew J Brown
(74) *Attorney, Agent, or Firm* — Meunier Carlin & Curfman LLC

(57) ABSTRACT

An airbag assembly for a vehicle according to various implementations includes an inflator and an airbag cushion. In some implementations, the airbag assembly also includes a housing. The inflator and the airbag cushion are stored in the housing when the airbag is in a non-deployed state. During a vehicle accident, the airbag cushion extends out of the housing to cushion movement of a vehicle occupant. The airbag cushion includes a main panel having a first edge and a second edge, a first side panel coupled to the first edge, and a second side panel coupled to the second edge. The first side panel and the second side panel comprise protrusions and a channel is defined by a portion of the main panel between the protrusions. In some implementations, the airbag assembly includes a second inflator.

20 Claims, 9 Drawing Sheets

(56) References Cited

FOREIGN PATENT DOCUMENTS

| DE | 102012018450 A1 | | 3/2014 | | |
|----|----|----|----|----|----|
| DE | 102020107330 A1 | * | 9/2020 | ………… | B60R 21/214 |
| DE | 102020107161 A1 | * | 9/2021 | | |
| EP | 4140829 A1 | * | 3/2023 | ………… | B60R 21/207 |
| KR | 20120103103 A | * | 9/2012 | | |
| KR | 20130083264 A | * | 7/2013 | | |
| WO | WO-2014154673 A1 | * | 10/2014 | ………… | B60R 21/231 |

* cited by examiner

AIRBAG WITH ROOF INTERACTION

CROSS-REFERENCE TO RELATED APPLICATIONS

This application claims the benefit of U.S. Provisional Patent Application No. 63/435,703, filed on Dec. 28, 2022, the entire contents of which are incorporated herein by reference.

TECHNICAL FIELD

The present disclosure relates to safety devices for passenger vehicles. In particular, the disclosure relates to an airbag that interacts with a roof of the vehicle. Passenger vehicles may include, for example, automobiles, boats, trains, aircrafts, and spacecrafts.

BACKGROUND

Airbags are often found in modern vehicles. Airbags require a reaction surface to brace against in order to cushion the movement of a vehicle occupant during an accident. For passenger seat airbags in automobiles, for example, this reaction surface can be the windshield, the dashboard, or a combination of the two. Without a reaction surface, the occupant's movement would overpower the airbag and eliminate its ability to absorb energy and cushion the occupant. However, some vehicle cabins may be designed in such a way that typical reaction surfaces are unavailable.

The advent of electric vehicles has opened up opportunities for new cabin design options. For example, the lack of an internal combustion engine opens up space in the vehicle for other uses. With new space and therefore new design options accessible, some typical airbag reaction surfaces are no longer available in certain vehicles. Alternatively, some traditional internal combustion engine vehicles include nontraditional cabin designs in order to compete in the modern market. In all these cases, a new airbag design may be desirable in order to provide proper occupant restraint.

SUMMARY

Various implementations include an airbag assembly for a vehicle. The assembly comprises an inflator and an airbag cushion. The airbag cushion comprises a main panel having an outer surface, an inner surface opposite the outer surface, a first edge, and a second edge spaced apart from the first edge. A first side panel is coupled to the first edge of the main panel and a second side panel is coupled to the second edge of the main panel. The first side panel comprises a first protrusion and a second protrusion and the second side panel comprises a third protrusion and a fourth protrusion. In a deployed state, a channel is defined by a portion of the outer surface of the main panel between a first axis extending between the first and third protrusions and a second axis extending between the second and fourth protrusions.

In other implementations, an airbag assembly for a vehicle comprises an inflator, a housing, and an airbag cushion. The airbag cushion comprises a main panel having an outer surface, an inner surface opposite the outer surface, a first edge, and a second edge spaced apart from the first edge. A first side panel is coupled to the first edge of the main panel and a second side panel is coupled to the second edge of the main panel. The first side panel comprises a first protrusion and a second protrusion and the second side panel comprises a third protrusion and a fourth protrusion. In a deployed state, a channel is defined by a portion of the outer surface of the main panel between a first axis extending between the first and third protrusions and a second axis extending between the second and fourth protrusions. In a non-deployed state, the inflator and the airbag cushion are disposed within the housing.

In other implementations, an airbag assembly for a vehicle comprises a first inflator and a second inflator. The assembly further comprises a housing and an airbag cushion. The airbag cushion comprises a main panel having an outer surface, an inner surface opposite the outer surface, a first edge, and a second edge spaced apart from the first edge. A first side panel is coupled to the first edge of the main panel and a second side panel is coupled to the second edge of the main panel. The first side panel comprises a first protrusion and a second protrusion and the second side panel comprises a third protrusion and a fourth protrusion. In a deployed state, a valley is defined by a portion of the outer surface of the main panel between a first axis extending between the first and third protrusions and a second axis extending between the second and fourth protrusions. In a non-deployed state, the first inflator, the second inflator, and the airbag cushion are disposed within the housing.

BRIEF DESCRIPTION OF THE DRAWINGS

The drawings are merely exemplary to illustrate steps, structure, and certain features that can be used singularly or in combination with other features. The disclosure should not be limited to the implementations shown.

DETAILED DESCRIPTION

The present disclosure relates to safety devices for passenger vehicles. The devices, assemblies, systems, and methods disclosed herein provide for an airbag assembly comprising an inflator and an airbag cushion which absorbs energy from an occupant's movement during a vehicle emergency event. The inflator and the airbag cushion may be stored in a housing. In one example, the airbag assembly is used for automobiles. During a vehicle emergency event, the inflator provides inflation gas to the airbag cushion. This causes the airbag cushion to inflate and extend out of the housing into a position adjacent the occupant. The airbag cushion comprises a main panel that defines a channel for interacting with a portion of the vehicle that provides a reaction surface for the airbag in nontraditional vehicle designs. In other examples, the assembly may be used in other passenger vehicles such as, but not limited to, boats, trains, aircrafts, and spacecrafts. By way of non-limiting example, a vehicle emergency event could include a vehicle accident, e.g., an impact with another vehicle or the surrounding environment.

Figure 1:
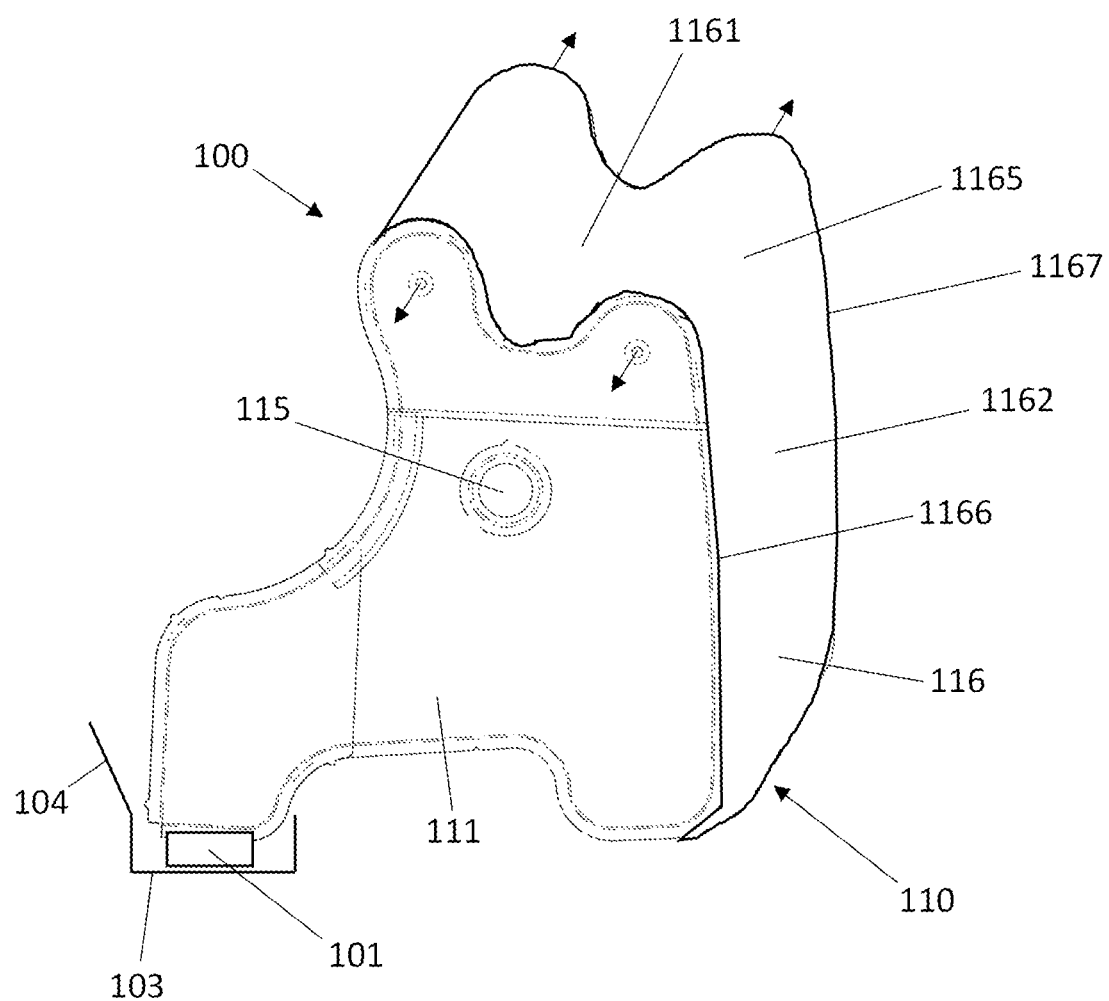
FIG. 1 is a perspective view of an airbag assembly according to one implementation in a deployed state.
Figure 5A:
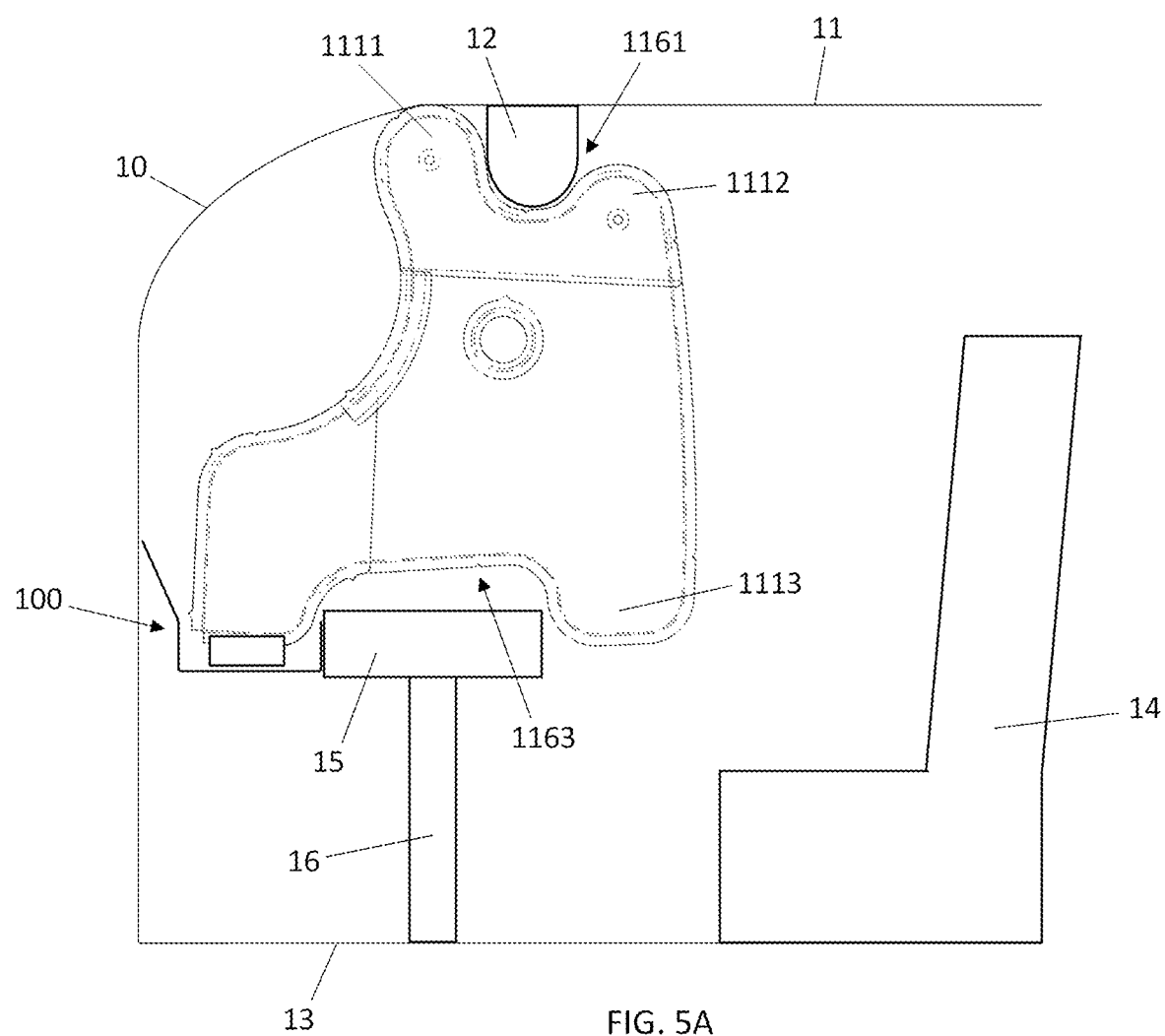
FIG. 5A-5B are side views of the airbag assembly of FIG. 1 installed in a vehicle cabin and in the deployed state and the non-deployed state, respectively.
Figure 5B:
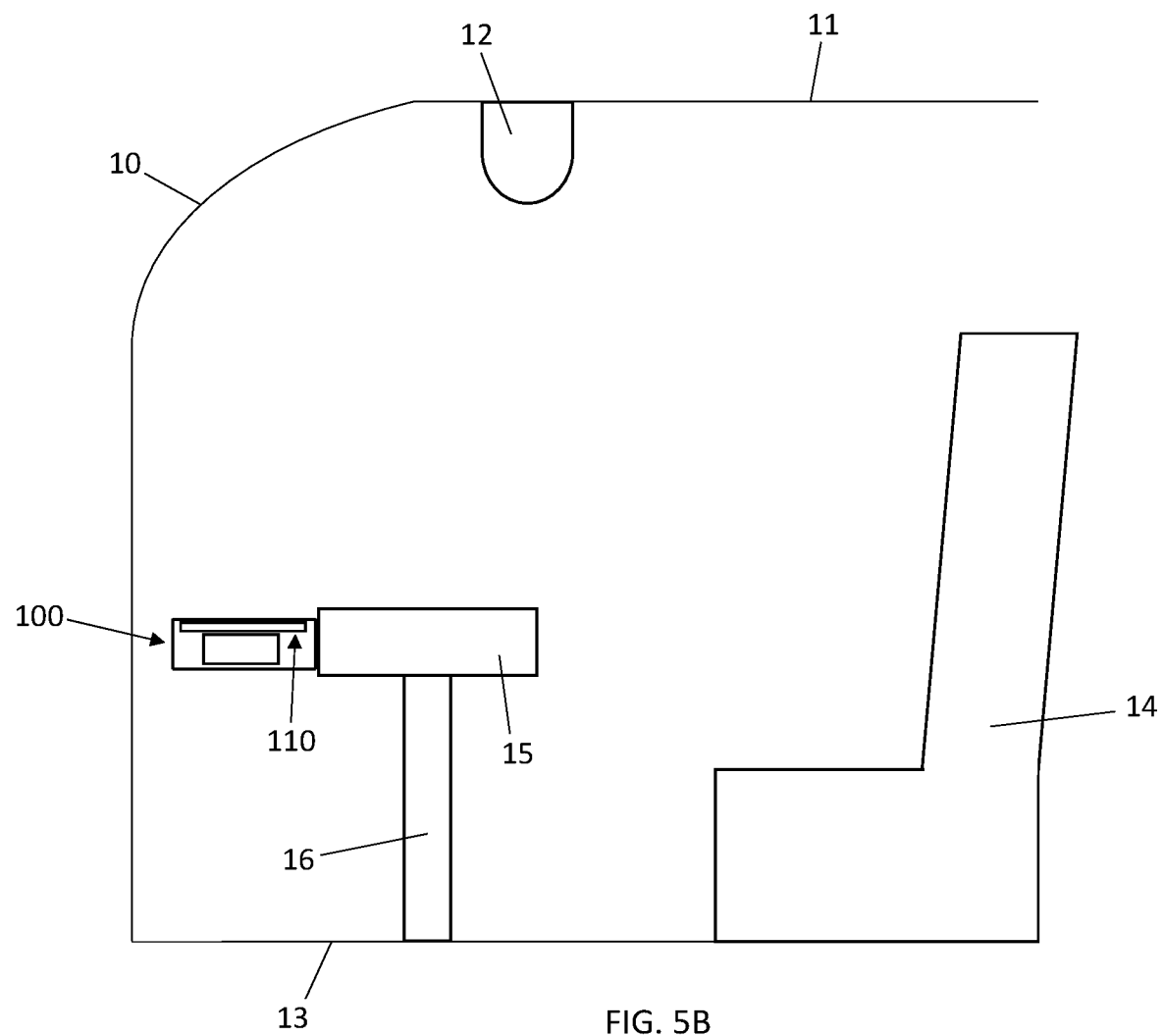

As shown in FIG. 1, a first implementation of an airbag assembly 100 includes an inflator 101, a housing 103, and an airbag cushion 110. The housing 103 comprises a cover 104. The inflator 101 and the airbag cushion 110 are disposed within the housing 103 and behind the cover 104 when the airbag assembly 100 is in a non-deployed state, as shown for example in FIG. 5B. In FIG. 1 and FIG. 5A, the airbag assembly 100 is shown in a deployed state. As shown in FIG. 2B, the airbag cushion 110 comprises a main panel 116 having an outer surface 1165, an inner surface 1164 opposite the outer surface 1165, a first edge 1166, and a second edge 1167 spaced apart from the first edge 1166.

A first side panel 111 is coupled to the first edge 1166 of the main panel 116 and a second panel 112 is coupled to the second edge 1167 of the main panel 116. The first side panel 111 comprises a first protrusion 1111 and a second protrusion 1112 and the second side panel 112 comprises a third protrusion 1121 and a fourth protrusion 1122. A first axis 113 extends between and through the first protrusion 1111 and the third protrusion 1121, as shown for example in FIG. 2A. A second axis 114 extends between and through the second protrusion 1112 and the fourth protrusion 1122, also shown for example in FIG. 2A. In the deployed state, a valley or a channel 1161 is defined by a portion of the outer surface 1165 of the main panel 116 between the first axis 113 and the second axis 114. In some implementations, the first side panel 111 or the second panel 112, or both, define a vent hole 115 through which inflation gas from the inflator 101 may exit the airbag cushion 110 during operation.

Figure 2A:
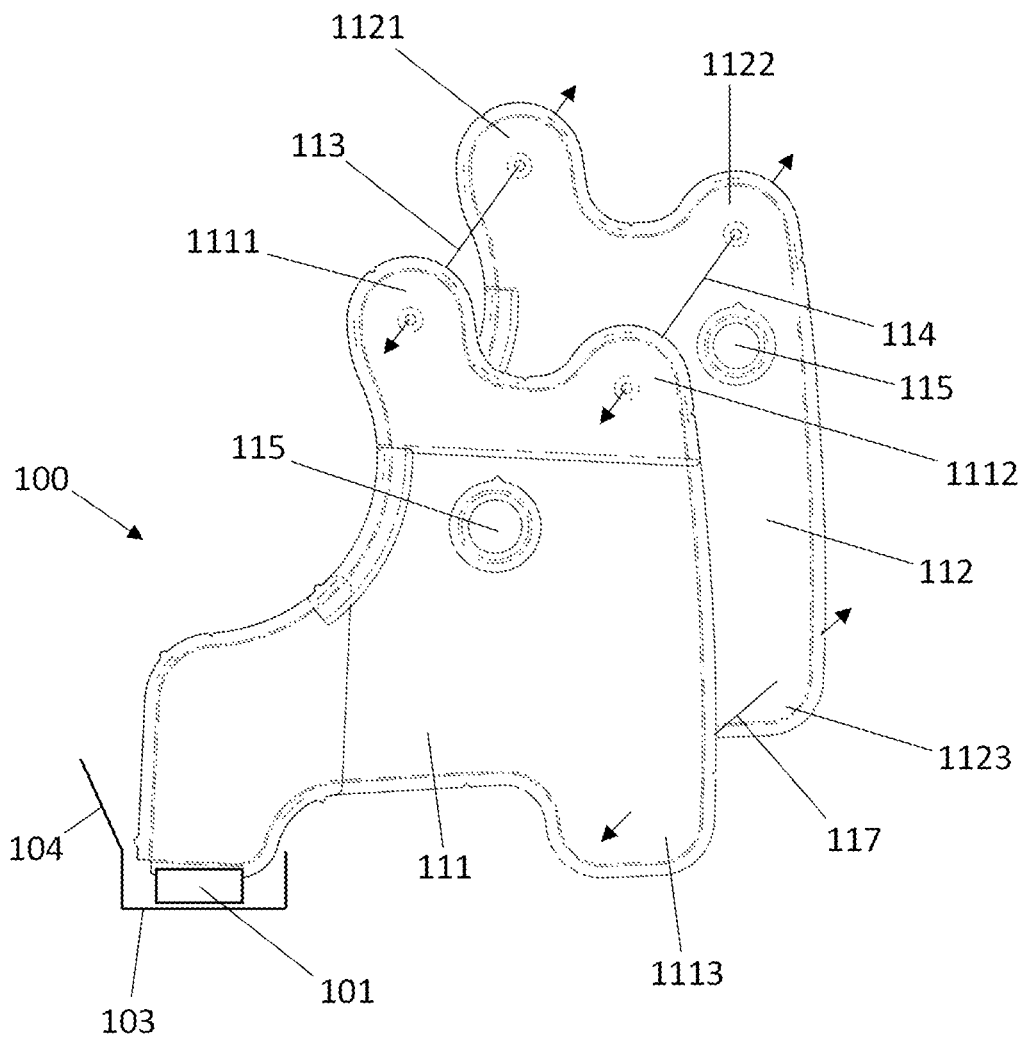
FIG. 2A is a perspective view of the airbag assembly of FIG. 1 without a main panel.
Figure 2B:
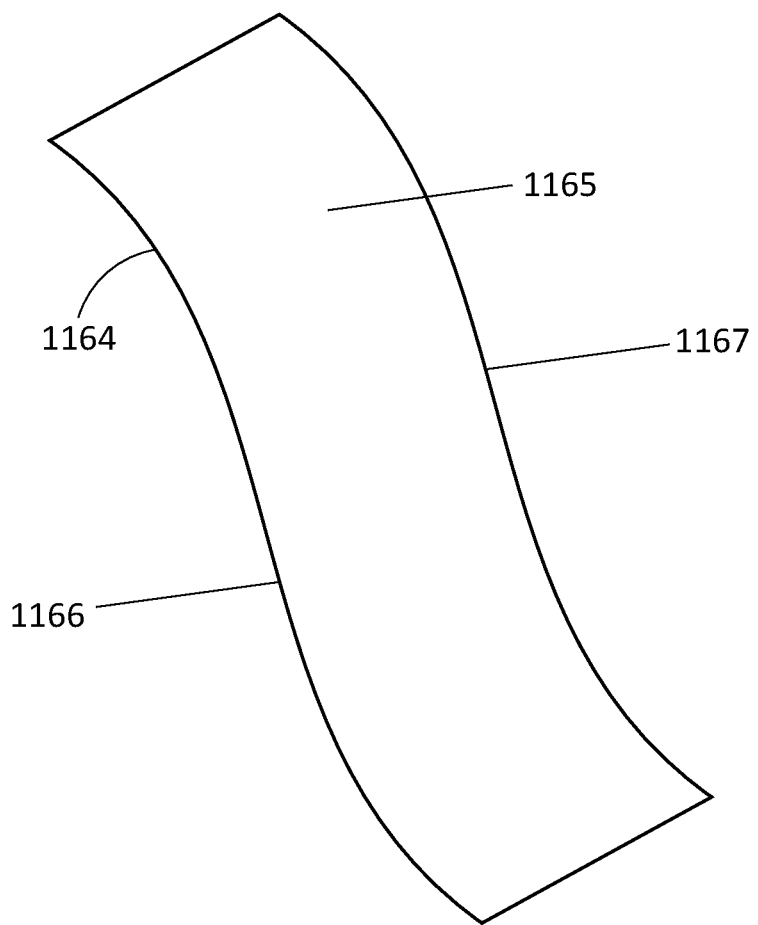
FIG. 2B is a perspective view of the main panel from the airbag assembly of FIG. 1 in an uncoupled state.

As shown in FIG. 2A, the first side panel 111 comprises a fifth protrusion 1113 and the second side panel 112 comprises a sixth protrusion 1123. In the deployed state, the fifth protrusion 1113 of the first side panel 111 extends away from the first protrusion 1111 of the first side panel 111 and the second protrusion 1112 of the first side panel 111. The sixth protrusion 1123 of the second side panel 112 extends away from the third protrusion 1121 of the second side panel 112 and the fourth protrusion 1122 of the second side panel 112.

Referring now to FIG. 5A, the airbag assembly 100 is shown installed in a vehicle cabin, specifically an automobile cabin. The airbag assembly 100 is in the deployed state. The vehicle comprises an occupant seat 14, a floor 13, a windshield 10, a roof 11, and a roof protrusion 12 coupled to the roof 11. The vehicle further comprises a dashboard 15 coupled to a dashboard mount 16 which is coupled to the floor 13. The housing 103 is coupled to the dashboard 15 and the airbag cushion 110 extends out of the housing 103 and upward towards the roof 11. The roof protrusion 12 is disposed within the channel 1161. In this configuration, the roof protrusion 12 provides for a reaction surface so that the airbag cushion 110 may cushion an occupant's movement during a vehicle emergency event when the occupant impacts an occupant contact zone 1162, thereby pushing the second protrusion 1112 and the fourth protrusion 1122, and a portion of the main panel 116 extending along the second axis 114, into the roof protrusion 12. In this way, the roof protrusion 12 helps to prevent the airbag cushion 110 from being overpowered by the occupant's movement, thus maintaining energy absorption capability. In some implementations, a portion of the first protrusion 1111 of the first side panel 111 and the third protrusion 1121 of the second side panel 112, and a portion of the main panel 116 extending along the first axis 113, may contact the windshield 10 providing for another reaction surface.

In the deployed state, a dashboard space 1163 is defined by a portion of the outer surface 1165 of the main panel 116 between the housing 103 and a third axis 117 that extends between and through the fifth protrusion 1113 and the sixth protrusion 1123. A portion of the fifth protrusion 1113 of the first side panel 111 and the sixth protrusion 1123 of the second side panel 112, and a portion of the main panel 116 extending along the third axis 117, may contact the dashboard 15 providing for yet another reaction surface. In some implementations, the fifth protrusion 1113 of the first side panel 111 and the sixth protrusion 1123 of the second side panel 112 extend toward the floor 13 in the deployed state.

Figure 3:
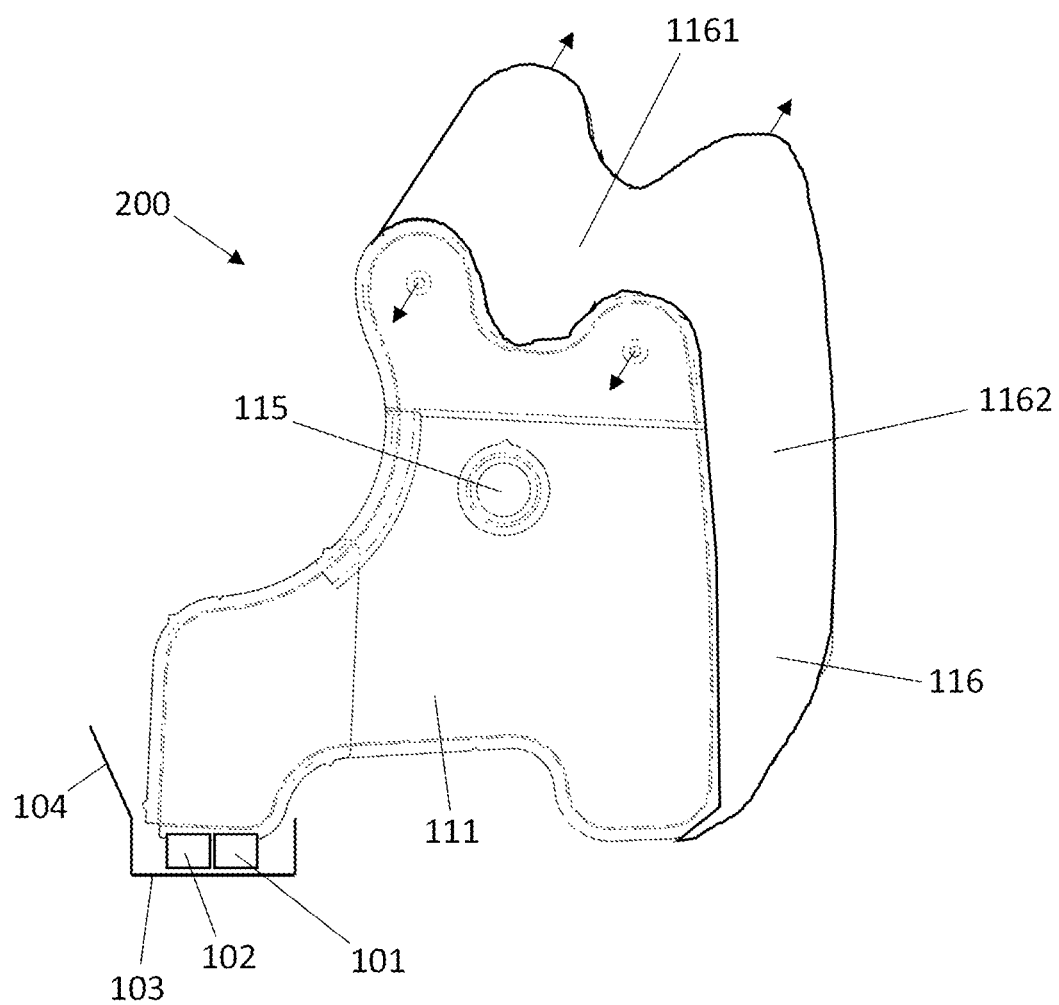
FIG. 3 is a perspective view of an airbag assembly according to another implementation in the deployed state.
Figure 4:
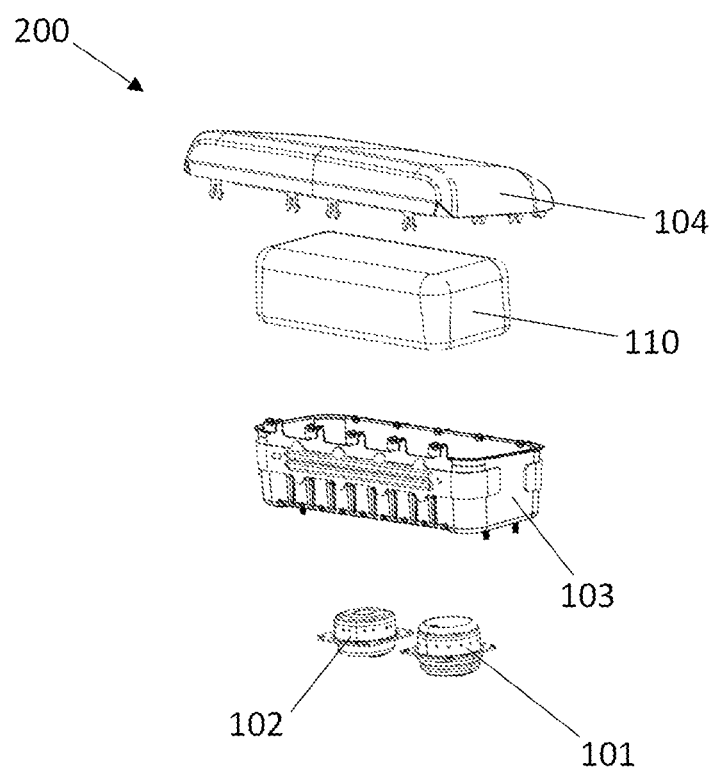
FIG. 4 is an exploded view of the airbag assembly of FIG. 3 in a non-deployed state.
Figure 6A:
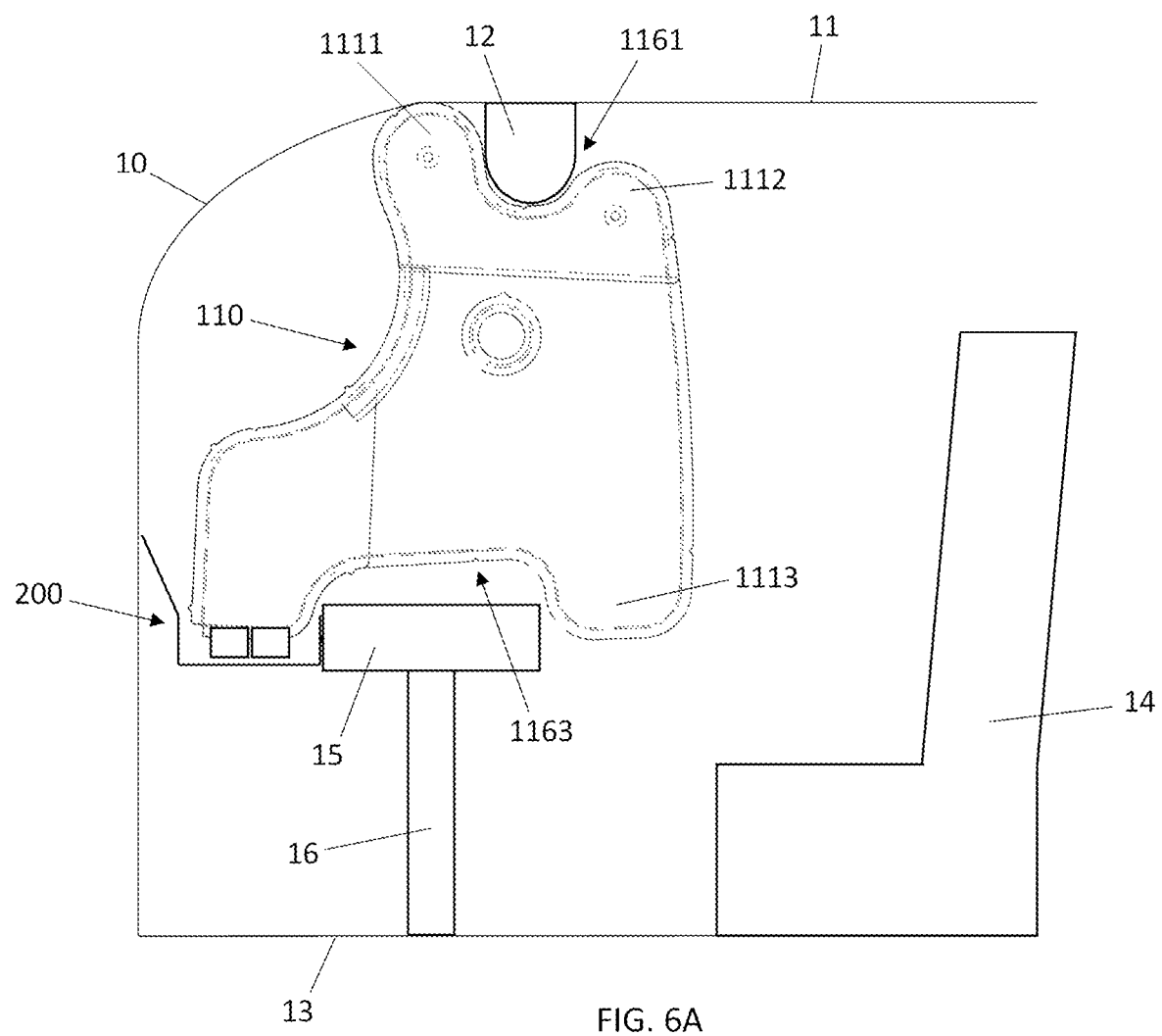
FIG. 6A-6B are side views of the airbag assembly of FIG. 3 installed in a vehicle cabin and in the deployed state and the non-deployed state, respectively.
Figure 6B:
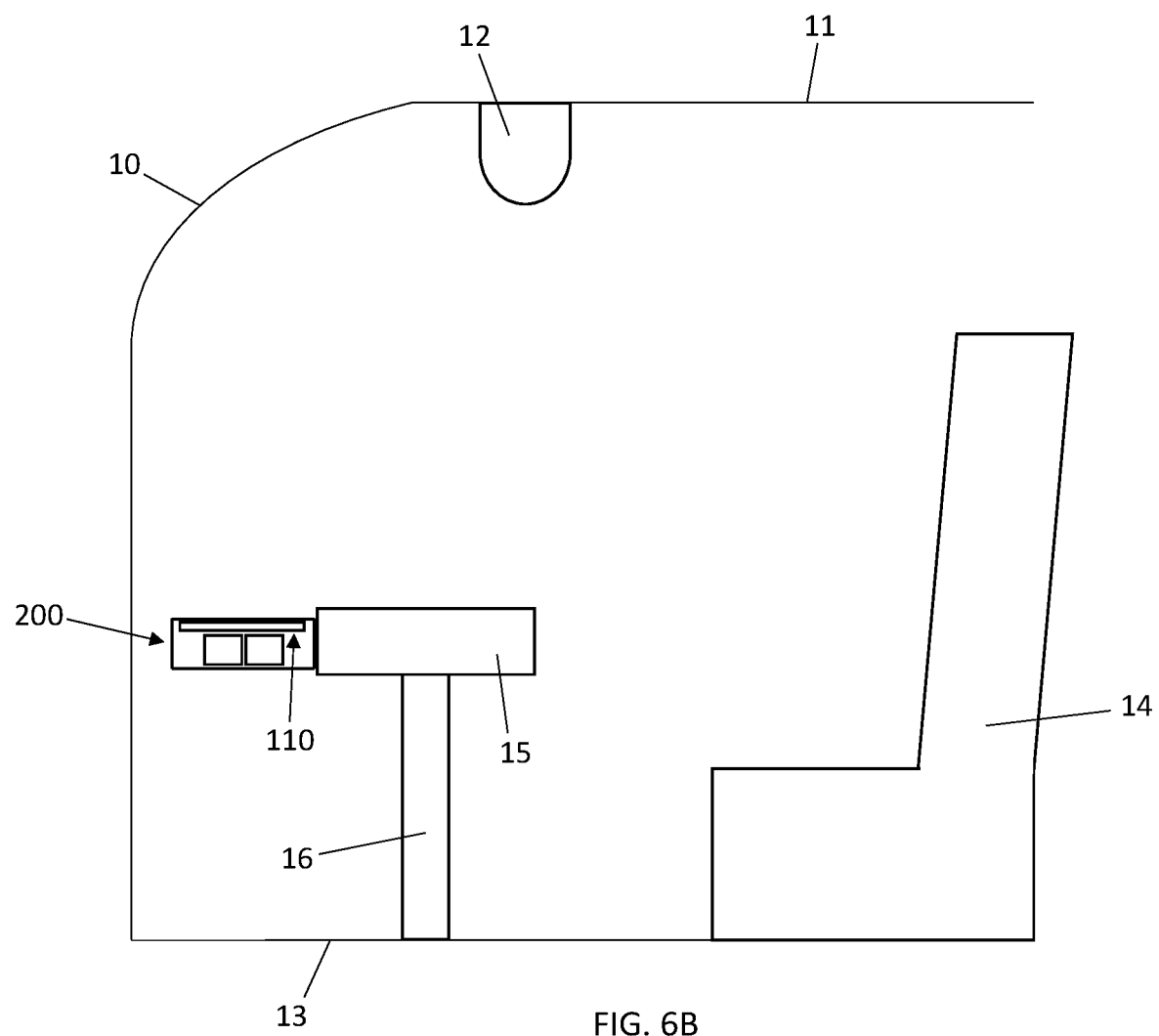

Referring now to FIG. 3, another implementation of an airbag assembly 200 includes a first inflator 101 and a second inflator 102. The first inflator 101, the second inflator 102, and the airbag cushion 110 are disposed within the housing 103 and behind the cover 104 when the airbag assembly 200 is in a non-deployed state, as shown for example in FIG. 6B. In FIG. 3 and FIG. 6A, the airbag assembly 200 is shown in a deployed state. In FIG. 4, the airbag assembly 200 in the non-deployed state is shown in an exploded view. In all other respects, the airbag assembly 200 is similar to the airbag assembly 100 described above.

The description in the present disclosure has been presented for purposes of illustration but is not intended to be exhaustive or limited to the implementations disclosed. It will be understood that various modifications and variations will be apparent to those of ordinary skill in the art and may be made without departing from the spirit and scope of the following claims. Accordingly, other implementations are within the scope of the claims. The implementations described were chosen in order to best explain the principles of the airbag assembly and its practical application, and to enable others of ordinary skill in the art to understand the assembly for various implementations with various modifications as are suited to the particular use contemplated.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

What is claimed is:

1. An airbag assembly for a vehicle comprising:
an inflator; and
an airbag cushion comprising:
 a main panel having an outer surface, an inner surface opposite the outer surface, a first edge, and a second edge spaced apart from the first edge;

a first side panel coupled to the first edge of the main panel; and a second side panel coupled to the second edge of the main panel;

wherein the first side panel comprises a first protrusion and a second protrusion and the second side panel comprises a third protrusion and a fourth protrusion; and wherein, in a deployed state, a channel is defined by a portion of the outer surface of the main panel between a first axis extending between the first and third protrusions and a second axis extending between the second and fourth protrusions;

wherein, in the deployed state, a roof protrusion of the vehicle is disposed within the channel.

2. The airbag assembly of claim 1, wherein the first side panel defines a first vent hole.

3. The airbag assembly of claim 2, wherein the second side panel defines a second vent hole.

4. The airbag assembly of claim 1, wherein the inflator is a first inflator and the airbag assembly further comprises a second inflator.

5. The airbag assembly of claim 1, further comprising a housing, wherein the airbag cushion and the inflator are disposed within the housing in a non-deployed state.

6. The airbag assembly of claim 5, wherein, upon deployment from the non-deployed state to the deployed state, the airbag cushion extends out of the housing.

7. The airbag assembly of claim 1, wherein the first side panel comprises a fifth protrusion and the second side panel comprises a sixth protrusion.

8. The airbag assembly of claim 7, wherein, in the deployed state, the fifth protrusion and the sixth protrusion extend away from the first and second protrusions and third and fourth protrusions, respectively.

9. An airbag assembly for a vehicle comprising:
an inflator;
a housing; and
an airbag cushion comprising:
a main panel having an outer surface, an inner surface opposite the outer surface, a first edge, and a second edge spaced apart from the first edge;
a first side panel coupled to the first edge of the main panel; and
a second side panel coupled to the second edge of the main panel;
wherein the first side panel comprises a first protrusion and a second protrusion and the second side panel comprises a third protrusion and a fourth protrusion;
wherein, in a deployed state, a channel is defined by a portion of the outer surface of the main panel between a first axis extending between the first and third protrusions and a second axis extending between the second and fourth protrusions;
wherein, in the deployed state, a roof protrusion of the vehicle is disposed within the channel; and wherein, in a non-deployed state, the inflator and the airbag cushion are disposed within the housing.

10. The airbag assembly of claim 9, wherein the first side panel defines a first vent hole.

11. The airbag assembly of claim 10, wherein the second side panel defines a second vent hole.

12. The airbag assembly of claim 9, wherein the inflator is a first inflator and the airbag assembly further comprises a second inflator.

13. The airbag assembly of claim 9, wherein, upon deployment from the non-deployed state to the deployed state, the airbag cushion extends out of the housing.

14. The airbag assembly of claim 9, wherein the first panel comprises a fifth protrusion and the second panel comprises a sixth protrusion.

15. The airbag assembly of claim 14, wherein, in the deployed state, the fifth protrusion and the sixth protrusion extend away from the first and second protrusions and third and fourth protrusions, respectively.

16. An airbag assembly for a vehicle comprising:
a first inflator and a second inflator;
a housing; and
an airbag cushion comprising:
a main panel having an outer surface, an inner surface opposite the outer surface, a first edge, and a second edge spaced apart from the first edge;
a first side panel coupled to the first edge of the main panel; and
a second side panel coupled to the second edge of the main panel;
wherein the first side panel comprises a first protrusion and a second protrusion and the second side panel comprises a third protrusion and a fourth protrusion;
wherein, in a deployed state, a valley is defined by a portion of the outer surface of the main panel between a first axis extending between the first and third protrusions and a second axis extending between the second and fourth protrusions;
wherein, in the deployed state, a roof protrusion of the vehicle is disposed within the valley; and
wherein, in a non-deployed state, the first inflator, the second inflator, and the airbag cushion are disposed within the housing.

17. The airbag assembly of claim 16, wherein the first side panel defines a first vent hole.

18. The airbag assembly of claim 16, wherein, upon deployment from the non-deployed state to the deployed state, the airbag cushion extends out of the housing.

19. The airbag assembly of claim 16, wherein the first panel comprises a fifth protrusion and the second panel comprises a sixth protrusion.

20. The airbag assembly of claim 19, wherein, in the deployed state, the fifth protrusion and the sixth protrusion extend away from the first and second protrusions and third and fourth protrusions, respectively.

* * * * *